(12) United States Patent
Dannecker et al.

(10) Patent No.: US 11,247,306 B2
(45) Date of Patent: Feb. 15, 2022

(54) ZERO-POINT CLAMPING DEVICE

(71) Applicant: SMW-Autoblok Spannsysteme GmbH, Meckenbeuren (DE)

(72) Inventors: Patrick Dannecker, Hardthausen (DE); Jürgen Marquart, Markdorf (DE); Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 46 days.

(21) Appl. No.: 16/811,568

(22) Filed: Mar. 6, 2020

(65) Prior Publication Data
US 2020/0368878 A1    Nov. 26, 2020

(30) Foreign Application Priority Data
May 20, 2019   (EP) ................................ 19175365

(51) Int. Cl.
 *B25B 5/02* (2006.01)
 *B25B 5/16* (2006.01)
(52) U.S. Cl.
 CPC .............. *B25B 5/02* (2013.01); *B25B 5/166* (2013.01)
(58) Field of Classification Search
 CPC .. B25B 5/02; B25B 5/166; B23Q 3/10; B23Q 3/106; B23Q 3/107; B23Q 3/108; B23Q 3/06; B23Q 1/0072; Y10T 279/188; Y10T 279/1953; Y10T 279/26
 USPC ........................................................ 269/216
 See application file for complete search history.

(56) References Cited

U.S. PATENT DOCUMENTS

| | | | | |
|---|---|---|---|---|
| 4,236,722 A | * | 12/1980 | Felker | .................. B23B 31/18 279/118 |
| 6,467,775 B1 | * | 10/2002 | Denzinger | ........ B23B 31/16212 279/119 |
| 9,302,359 B2 | * | 4/2016 | Hediger | ............... B23Q 1/0072 |
| 2018/0141176 A1 | * | 5/2018 | Fukui | ..................... B25B 5/064 |

FOREIGN PATENT DOCUMENTS

| | | |
|---|---|---|
| DE | 102017114150 | 6/2017 |
| EP | 1886751 | 2/2007 |
| EP | 3360633 | 2/2017 |
| WO | WO039807 | 5/2003 |

* cited by examiner

*Primary Examiner* — Joseph J Hail
*Assistant Examiner* — J Stephen Taylor
(74) *Attorney, Agent, or Firm* — Pandiscio & Pandiscio

(57) ABSTRACT

A zero-point clamping device for centering an object (2), the device comprising: a housing (4), a receiving opening (5), and two opposite clamping slides (7, 8) mounted axially displaceably in a bore (9) in the housing (4), which open into the receiving opening (5) during clamping and act on the object (2) to center it, wherein clamping is achieved by an actuating element (11) rotatably mounted in the housing (4), the axis of rotation (12) of which runs parallel to the clamping slides (7, 8), a through-opening (13) aligned perpendicularly to the clamping slides (7, 8), and a pivot pin (14, 15) inserted into the through-opening (13), one free end (16) of which engages in a guide groove (18) in a driving arrangement, and the opposite free end (17) of which is inserted into an abutment (21) associated with the housing (4) and is held in a tilting arrangement.

15 Claims, 10 Drawing Sheets

ZERO-POINT CLAMPING DEVICE

REFERENCE TO PENDING PRIOR PATENT APPLICATION

This patent application claims benefit of European Patent Application No. 19 175 365.6, filed May 20, 2019, which patent application is hereby incorporated herein by reference.

FIELD OF THE INVENTION

The invention relates to a zero-point clamping device according to the pre-characterising clause of Patent Claim 1, by which an object is centered and fixed in space with high repeatability.

BACKGROUND OF THE INVENTION

Clamping devices are required on machine tools to support objects to be machined, in particular rotationally symmetrical workpieces, because these workpieces are to be machined in series and can therefore be exchanged without loss of time. The specified machining position of the workpiece with respect to a reference value, which is defined as the so-called zero point, should be maintained in order to avoid the need to measure the workpiece position again. Accordingly, the zero point is defined in relation to the machine tool or its tool table and the spatial position of the clamped workpiece is determined for this point. The zero point therefore serves as a reference value for the machining position of the workpiece. When exchanging the workpieces, there should therefore be an identical distance to the specified reference value (zero point).

Such a zero-point clamping device can be found, for example, in EP 1 886 751 B1. The clamping device consists of a housing in which a receiving opening is incorporated. A retaining bolt can be inserted into the receiving opening, which is fixed by means of clamping slides arranged laterally in the housing. The clamping slides are arranged perpendicular to the centering axis of the retaining bolt and thus move in a radial direction into the interior of the receiving opening and outwards to release it. The clamping slides come into frictional contact with the retaining bolt, which secures it in the clamped condition.

The clamping slides are actuated synchronously by means of an axially actuated setting piston. An inclined surface or oblique plane is provided between the end face of the setting piston, which is designed as a ring or cylinder, and the respective clamping slides, so that the axial feed movement of the setting piston is converted into a radial feed movement for the clamping slides via the geometry of the inclined surface or oblique plane.

The disadvantage of such clamping devices has been found to be that they require very large structural dimensions, because the axial feed movements of the setting piston must be supported in the housing. In addition, the infeed path of the clamping slides is extremely small, because the inclined surfaces between the setting piston and the respective clamping slides limit this movement possibility. At the same time, the frictional connection between the setting piston and the clamping slides means that the outer diameter of the housing has to be considerably enlarged in order to provide a corresponding radial movement possibility for the clamping slides. As a result, the housing of the known clamping device is constructed in such a way that both its height and its outer circumference are correspondingly large. Often, however, the available spaces or spatial conditions on machine tools are limited, so that such zero-point clamping devices cannot be used at all.

SUMMARY OF THE INVENTION

It is therefore the task of the present invention to further develop a zero-point clamping device of the aforementioned type in such a way that, on the one hand, it enables a reliable, permanent and repeatable fixing of a large number of workpieces, tools, pallets or other objects and, on the other hand, that the housing of the clamping device is extremely compact, i.e. its outer dimensions can be kept extremely small in height and diameter.

In addition, several of the clamping devices designed in this way should be able to be combined with one another in a driving arrangement on different planes in order to ensure or achieve that only one manual, electric, pneumatic or hydraulic drive is required for several such clamping devices.

This task is solved by the features of the characterising part of Patent Claim 1.

Further advantageous embodiments of the present invention are derived from the subordinate claims.

Due the facts that an actuating element is rotatably mounted in the housing, the axis of rotation of which runs parallel to the clamping slides, that a through-opening is worked into each clamping slide, which is aligned perpendicular to the longitudinal axis of the clamping slides, that a pivot pin is inserted into each through-opening, one free end of which engages in a guide groove incorporated in the actuating element and is connected to it in a driving manner, and the opposite second free end of which is inserted in an abutment associated with the housing and is held in this abutment in a tiltable manner, an extremely compact overall height is created, since all mechanical components required to move the clamping slides lie in a common plane.

The actuating element is also accessible from the outside, so that it can be operated either manually by means of a screwdriver or square spanner, or in a driving arrangement by means of an electric motor to turn it into the appropriate rotation in the clockwise or counterclockwise direction. Due to the rotation of the actuating element, there is a displacement of the pivot pin connected to the actuating element, because the guide groove incorporated in the actuating element runs spirally, i.e. it is inclined in relation to the axis of rotation of the actuating element. Thus, the pivot pins move outwards or inwards or in a circular path in relation to the axis of rotation of the actuating element, causing a radial feed movement to act on the clamping slides when the actuating element is turned clockwise, for example, and a feed movement to be generated outwards when the actuating element is turned counterclockwise.

The pivot pins are inserted in an abutment for mounting on the housing and have a spherical outer contour, which is inserted in a cup with a matching inner contour. Consequently, the pivot pins pivot about the mounting thus formed between the support of the ball head and the cup-like contact surface of the abutment as soon as the actuating element is rotated. According to this, a synchronous radial feed movement of the clamping slides is generated, since the inclination and design of the respective guide grooves in the actuating element is identical.

In addition, several of the existing actuating elements of one of the clamping devices in accordance with the present invention can be coupled with one another in a driving manner, so that only one manual, electric, pneumatic or hydraulic drive is required for the rotation of the respective actuating elements. Such clamping devices can be advantageously arranged on different planes, so that an object can be fixed in several spatially separated positions.

BRIEF DESCRIPTION OF THE DRAWINGS

The drawings show a zero-point clamping device configured in accordance with the present invention, the details of which are explained below. In the drawings.

DETAILED DESCRIPTION OF THE PREFERRED EMBODIMENTS

Figure 1:
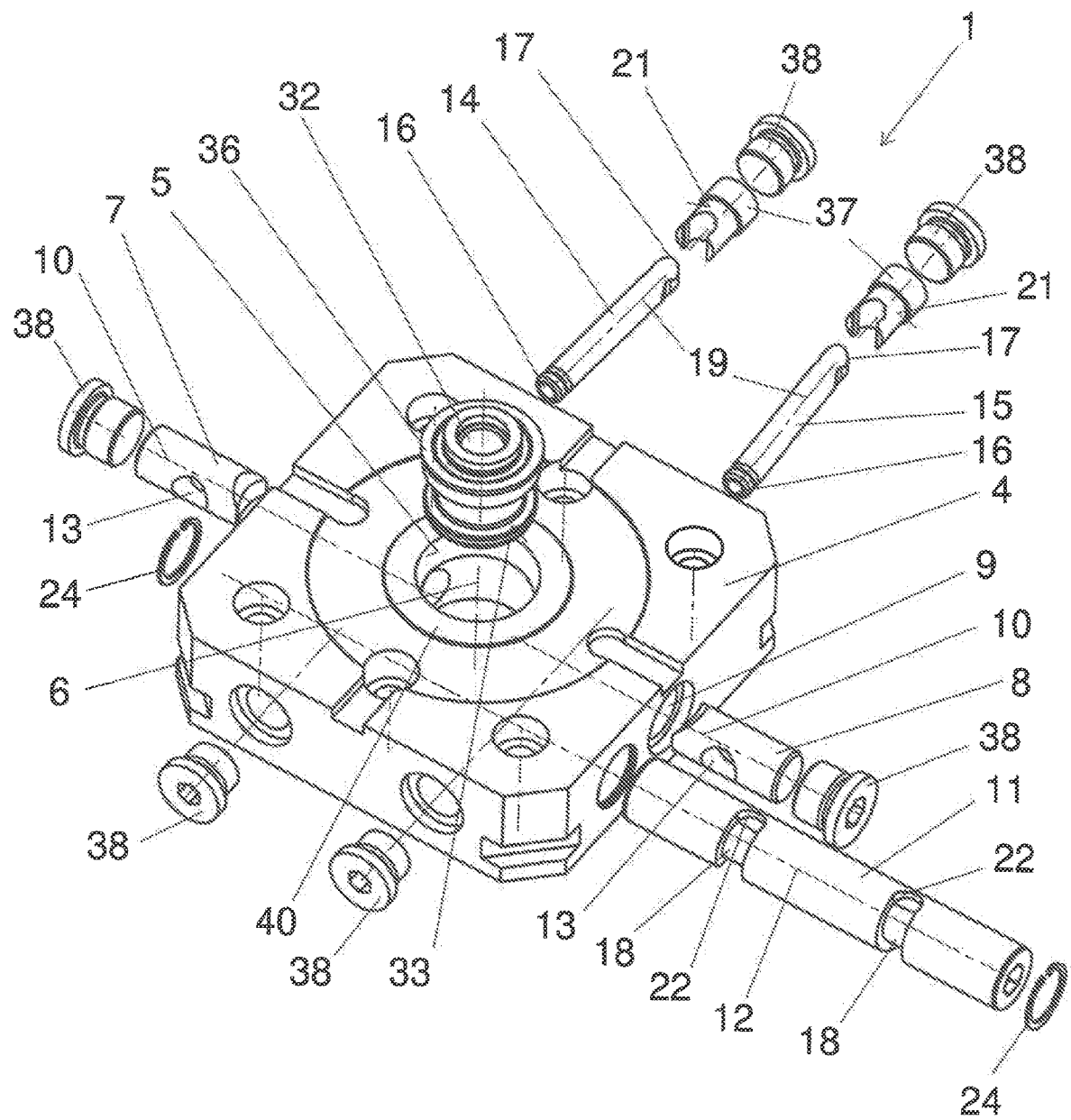
FIG. 1 shows a zero-point clamping device with a housing in which a receiving opening is provided, with two clamping slides opposite one another, by means of which a clamping sleeve which can be inserted into the receiving opening is fixed in a centered manner, with an actuating element rotatably mounted in the housing and with two pivot pins which interact in a driving manner with the actuating element and the clamping slides and which are each tiltably mounted in an abutment associated with the housing, in an exploded view.

FIG. 1 shows the arrangement of components of a zero-point clamping device 1, by means of which an object 2 can be centered and fixed to it with high repeatability. The object 2 is to be considered as a tool, as a workpiece to be machined or as a flat component. However, the clamping device 1 can also be used to support a plurality of pallets or other structures, support frames or the like which are spaced apart from one another.

Each object 2 to be clamped must be aligned in the clamped condition of the object 2 with a centering axis 6, which forms the center point of a round receiving opening 5 provided in a housing 4. Either the object 2 can be inserted directly into the receiving opening 5 or a carrier part, in the form of a clamping sleeve 32, can be inserted and has an axis of symmetry 3. When a rotationally symmetrical clamping sleeve 32 is used, the object 2 is pre-assembled on it and the axis of symmetry 3 runs coaxially to the centering axis 6 as soon as the clamping condition is achieved.

The clamping device 1 consists of a housing 4, in the center of which the receiving opening 5 is incorporated. To fix the clamping sleeve 32, two opposite clamping slides 7, 8 are provided, which are mounted in an axially displaceable arrangement in the housing 4 in a bore 9. In the clamped condition, the clamping slides 7, 8 act on the clamping sleeve 32 and fix it. Thus the clamping slides 7, 8 are inserted in the bore 9 incorporated in the housing 4 and the longitudinal axes 10 of the clamping slides 7, 8 and bore 9 are coaxial to one another. The centering axis 6 of the receiving opening 5 and the longitudinal axis 10 are at a perpendicular angle to one another and intersect at a center point of the two axes 6 and 10.

Parallel to the longitudinal axis 10 and thus parallel to and spaced apart from the clamping slides 7, 8, an actuating element 11 is provided which is rotatably mounted in a bore 9 worked into the housing 4. The two free ends of the actuating element 11 arranged opposite one another are freely accessible from the outside, so that the actuating element 11 can be driven or rotated manually, for example by means of a screwdriver, or mechanically by means of an electric motor. The actuating element 11 consequently has an axis of rotation 12 which runs parallel to the longitudinal axis 10 and is spaced apart from it. Two drive openings 20 are provided in the housing 4 in the area of the free ends of the actuating element 11.

In order to achieve the driving connection between the actuating element 11 and the clamping slides 7, 8, which are to be moved synchronously, two pivot pins 14, 15 are mounted in the housing 4, which are essentially perpendicular to the longitudinal axis 10 and the rotation axis 12, respectively. To transmit the rotary movements of the actuating element 11, two spirally aligned guide grooves 18 are worked into the surface of the actuating element 11, into which the respective first free end 16 of the pivot pins 14 and 15 is inserted, thus forming a driving connection between them. At a distance from this force transmission position, the second free ends 17 of the pivot pins 14 and 15 are inserted in an abutment 21 assigned to the housing 4. Accordingly, the pivot pins 14, 15 are inserted between the actuating element 11 and the respective abutment 21 and bridge the distance specified by these components.

In addition, the clamping slides 7, 8 each have a through-opening 13, through which the respective pivot pins 14, 15 are passed.

In the sample embodiment, the through-opening 13 is completely closed. However, it can also be designed as a U-shaped channel or guide groove.

Figure 2:
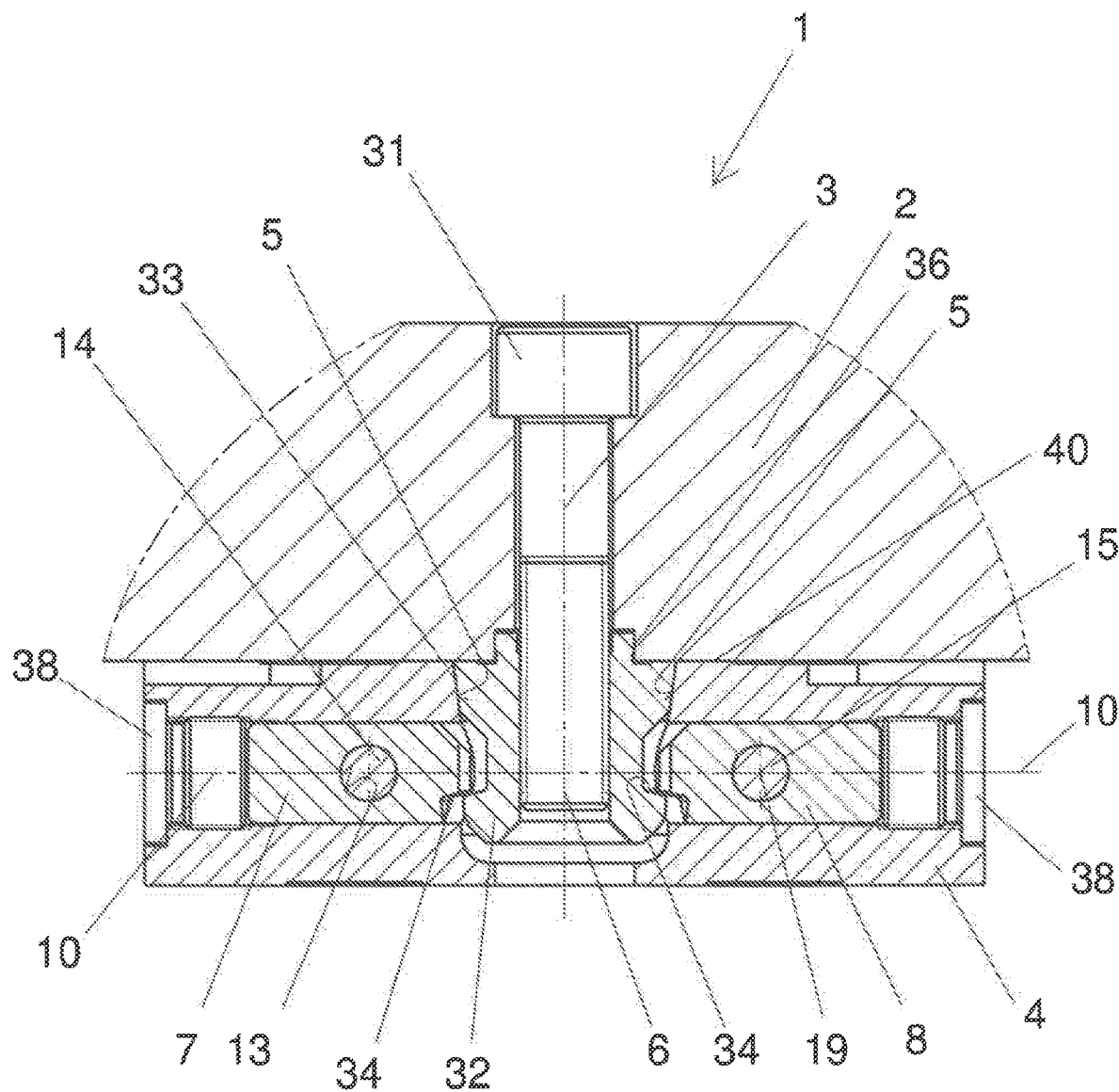
FIG. 2 shows the clamping device according to FIG. 1 along the intersection line II-II, with an object held centered on the housing and attached to the clamping sleeve by a threaded pin in the form of a carrier part.

FIG. 2 shows how the object 2 is first fixed to the clamping sleeve 32 by means of a threaded pin 31. A threaded bore 35 is incorporated in the clamping sleeve 32, into which the threaded pin 31 is screwed and it thus connects the object 2 with the clamping sleeve 32. In order to center the object 2 on the clamping sleeve 32, the sleeve has a ring-shaped centering surface 36, against which the object 2 rests without play. Thus, a large number of identical or differently configured objects 2 can be pre-assembled on an identical clamping sleeve 32 in order to ensure the quickest possible exchange or replacement of objects 2 on clamping device 1.

In addition, a circumferential centering receptacle 33 is worked into the clamping sleeve 32, which has an inclined or oblique plane 34 in its lower area shown, which interacts with the two clamping slides 7, 8 during the clamping process. The oblique plane 34 is inclined at a particular angle to the horizontal in order to achieve self-locking in the clamped condition between the clamping slides 7, 8 and the centering surface 34 of the clamping sleeve 32. At the same time, the horizontal inclination of the oblique plane 34 additionally converts the radial clamping force of the clamping slides 7, 8 into an axial force component, by means of which the clamping sleeve 32 and thus the object 2 is pressed or pulled into the interior of the housing 4. The clamping slides 7 and 8 have a clamping surface that is aligned in the opposite direction to the inclination of the centering surface 34. In addition, the receiving opening 5 is conical in cross-section in its entrance area, thus forming a further centering surface 40 for the clamping sleeve 32, against which it is pressed without play during the clamping process.

Figure 3A:
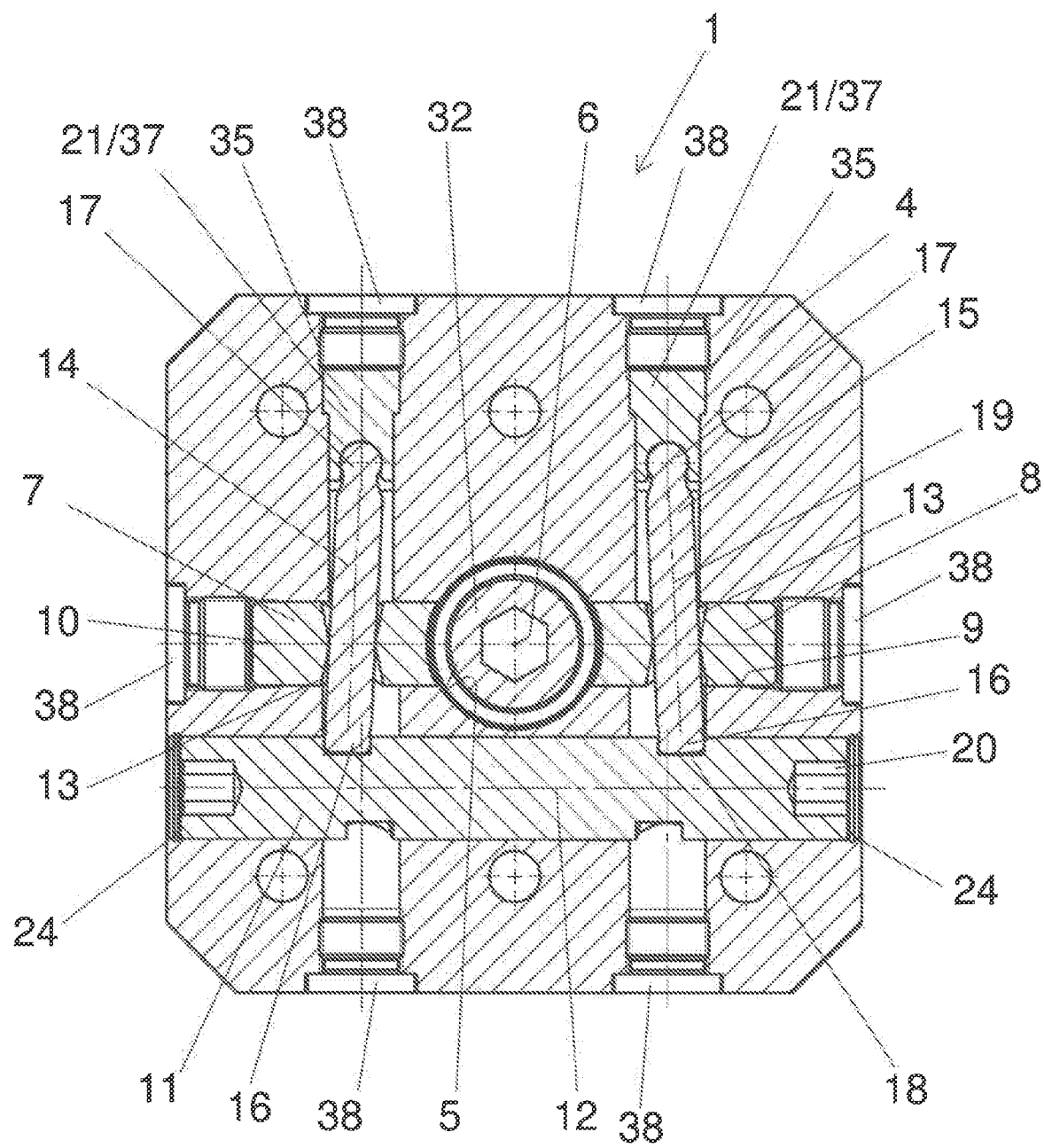
FIG. 3a shows a plan view of the clamping device according to FIG. 1, with the clamping slides open.
Figure 3B:
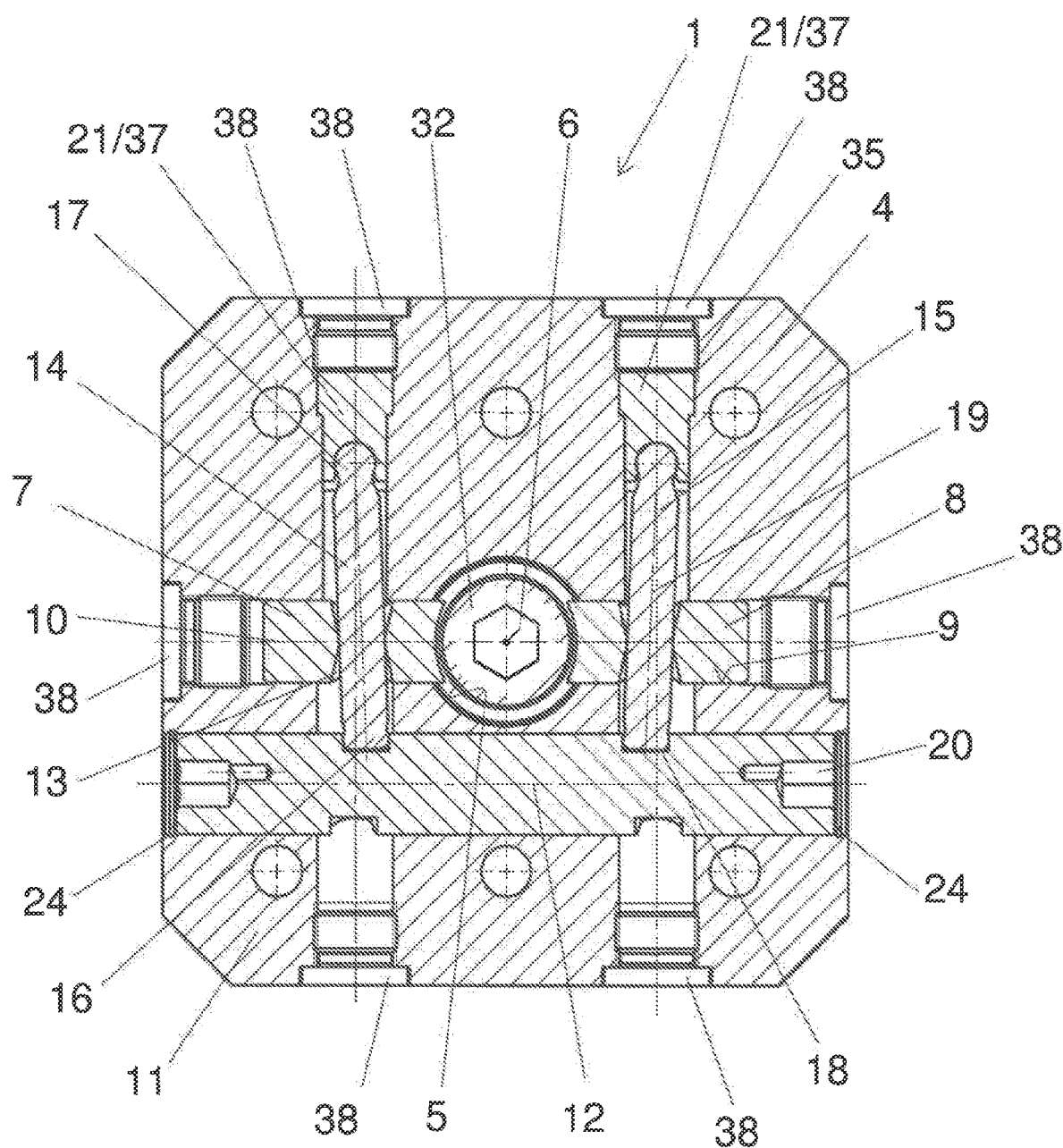
FIG. 3b shows the clamping device according to FIG. 3a, in the clamped condition.

FIGS. 3a and 3b show the movement sequence of the clamping process and the unlocking, respectively. As soon as the actuating element 11 is turned in a predetermined direction, e.g. clockwise, the first free ends 16 of the pivot pins 14, 15 move in the direction of the receiving opening 5, i.e. in the direction of the center of the housing 4, due to the spiral design of the guide grooves 18. This movement corresponds to a pitch circle. The tilting movement of the pivot pins 14, 15 is transmitted directly to the respective clamping slides 7 or 8 by the driving coupling of the pivot pins 14, 15 with the clamping slides 7, 8, in that the pivot pins 14 and 15 engage through the through-hole 13 worked into the clamping slides 7, 8, in which case the clamping slides 7, 8 are moved synchronously and radially in the direction of the receiving opening 5, and this takes place until the clamping slides 7, 8 come into a corresponding clamping contact with the clamping sleeve 32 and pull this into the interior of the housing 4, and are thus pressed against the centering surface 40 of the receiving opening 5 without play.

The abutment 21 is provided to support the tilting or pivoting movements of the pivot pins 14, 15 opposite to the actuating element 11. The abutment 21 consists of a bearing pin 37, which is screwed into a threaded bore 35 worked into the housing 4. The free end of the bearing pin 37 facing the respective pivot pin 14, 15 has a cup-shaped inner contour and the second free end 17 of the pivot pin 14, 15 is designed as a ball head. The respective geometric dimensions of the free ends 17 and the inner contour of the bearing pins 37 are adapted to one another in such a way that the pivot pins 14, 15 are movable about the respective longitudinal axis 19 in the area of the actuating element 11. Thus the bearing pin 37 and the second free ends 17 of the pivot pins 14, 15 form a center of rotation around which the pivoting movement of the first free ends 16 of the pivot pins 14, 15 takes place on a circular path.

The actuating element 11 is secured in the housing 4 by two circlips 24a, which are each located in the area of the receiving opening 20 and by which the actuating element is held so that it can rotate in the axial direction.

As soon as the pivot pins 14, 15 and the four bearing pins 37 are mounted in the housing 4, the respective opening for the insertion of the bearing pins 37 can be closed in a water-tight or gas-tight condition by means of a sealing bush 38 to prevent the entry of dirt into the interior of the housing 4.

Figure 4A:
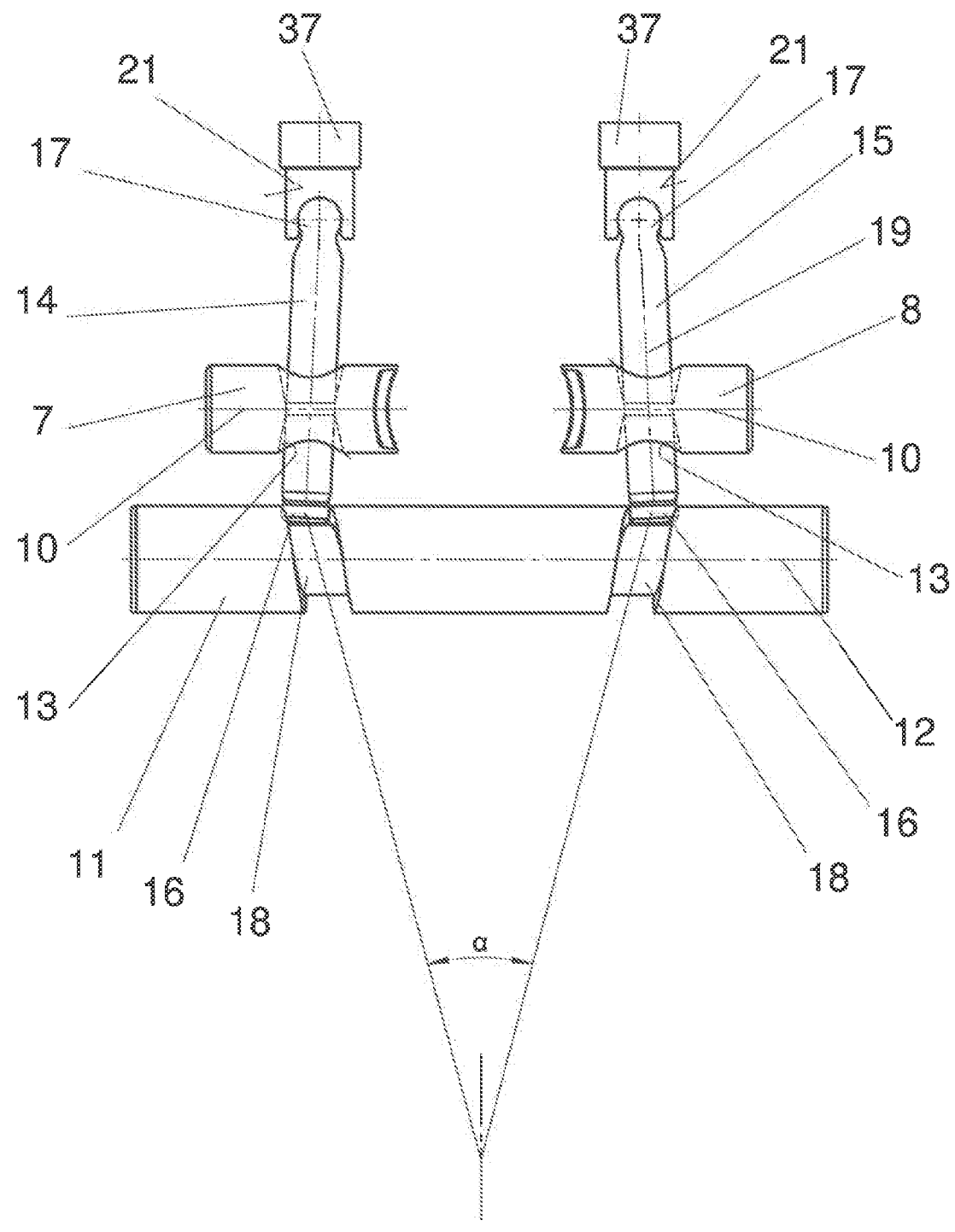
FIG. 4a shows an enlarged section of the clamping device according to FIG. 3b and the connection between the clamping slides, the pivot pins and the actuating element.

The geometric configurations for the transmission of force and movement are shown in FIG. 4a. The two guide grooves 18 incorporated in the actuating element 11 are inclined at an angle a to one another. The intersection point of the center lines of the guide grooves 18 is purely virtual and is located outside the housing 4. By this schematic arrangement of the components essential to the invention, the conversion of the rotary motion of the actuating element 11 into a synchronous and radial feed motion of the clamping slides 7, 8 is to be explained by the circular motion of the pivot pins 14, 15 and their support in the abutment 21.

Figure 4B:
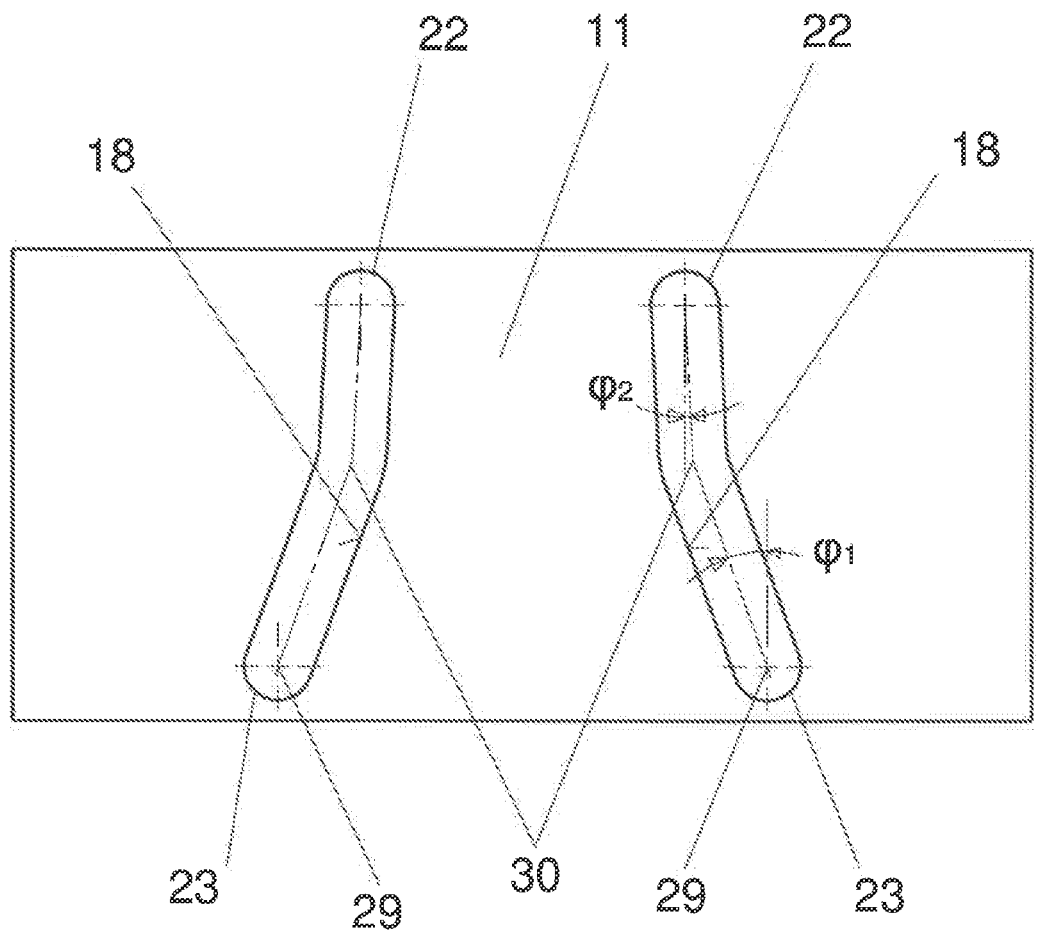
FIG. 4b shows an enlarged section of two guide grooves worked into the actuating element to accommodate the free ends of the two pivot pins.

FIG. 4b shows the configuration of the two guide grooves 18 in the actuating element 11. The guide grooves 18 have two different inclinations or pitches, because the feed movement of the clamping slides 7, 8 should take place at a high speed during their feed. A small actuating force is required for this, so that the pitch or inclination of the guide grooves relative to a reference axis can be greater than the pitch or inclination during the clamping process.

The first angle of inclination is drawn schematically as q1 and the second angle of inclination as q2 in FIG. 4b. The respective starting point is marked with the reference number 29 and the transition point with the reference number 30. The transition point 30 is assigned to the point of contact of the clamping slides 7, 8 on the centering surface 34 of the clamping sleeve 32. Starting from the fully opened condition of the clamping slides 7, 8, they are first moved to the starting point 29 with the angle of inclination q1 in the direction of the clamping sleeve 32. Only a small actuating force is required in this case. As soon as the clamping slides 7, 8 come into active contact with the clamping sleeve 32, the first free ends 16 of the pivot pins 14, 15 are in the area of the second angle of inclination q2—transition point 30—which reduces the feed rate and at the same time considerably increases the transmitted actuating force compared to the first angle of inclination q1.

Figure 5:
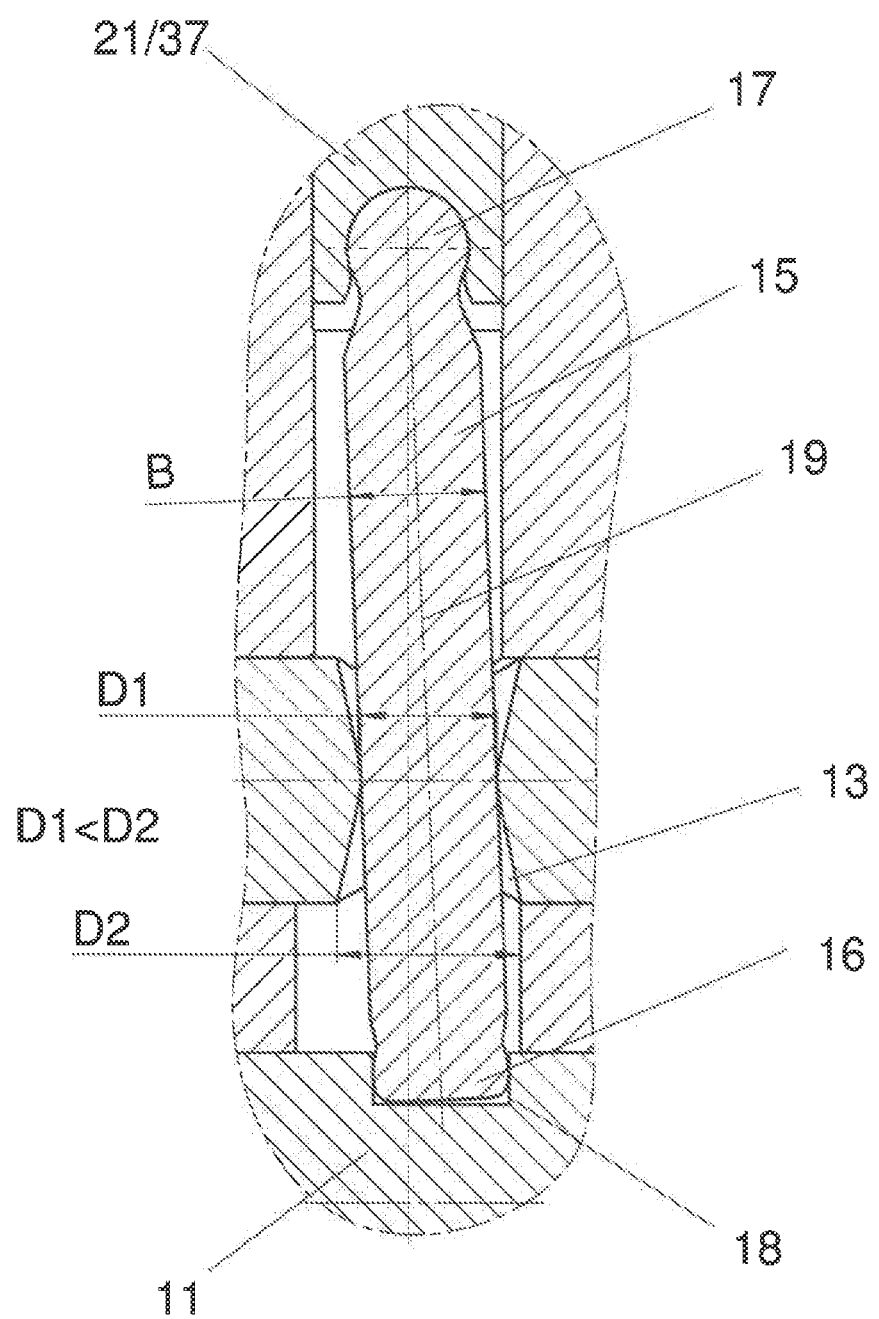
FIG. 5 shows an enlarged section of one of the pivot pins, which is in engagement with one of the clamping slides and the actuating element as well as the abutment, in a section.

FIG. 5 shows the driving connection between the actuating element 11 and one of the pivot pins 14 or 15, its mounting in one of the clamping slides 7, 8 and the pivot pin being supported by engagement with the cup-shaped inner contour of the bearing pin 37 and the abutment 21. To prevent the pivot pins 14, 15 from canting or jamming in the clamping slides and 7, 8, the through-hole 13, through which the pivot pins 14, 15 are passed, is widened. The diameter D1 of the through-hole 13 provided in the area of the longitudinal axis 10 is smaller than the diameter D2 provided on the outside of the respective clamping slides, 7, 8. The width B of the pivot pins 14, 15 corresponds to the inside diameter D1. The respective pivot pin 14, 15 is thus in annular contact with the inside diameter D1 of the through-hole 13 regardless of its position and is transmitted to the clamping slides 7, 8 by the actuating force generated by the actuating element 11 during rotation.

Figure 6:
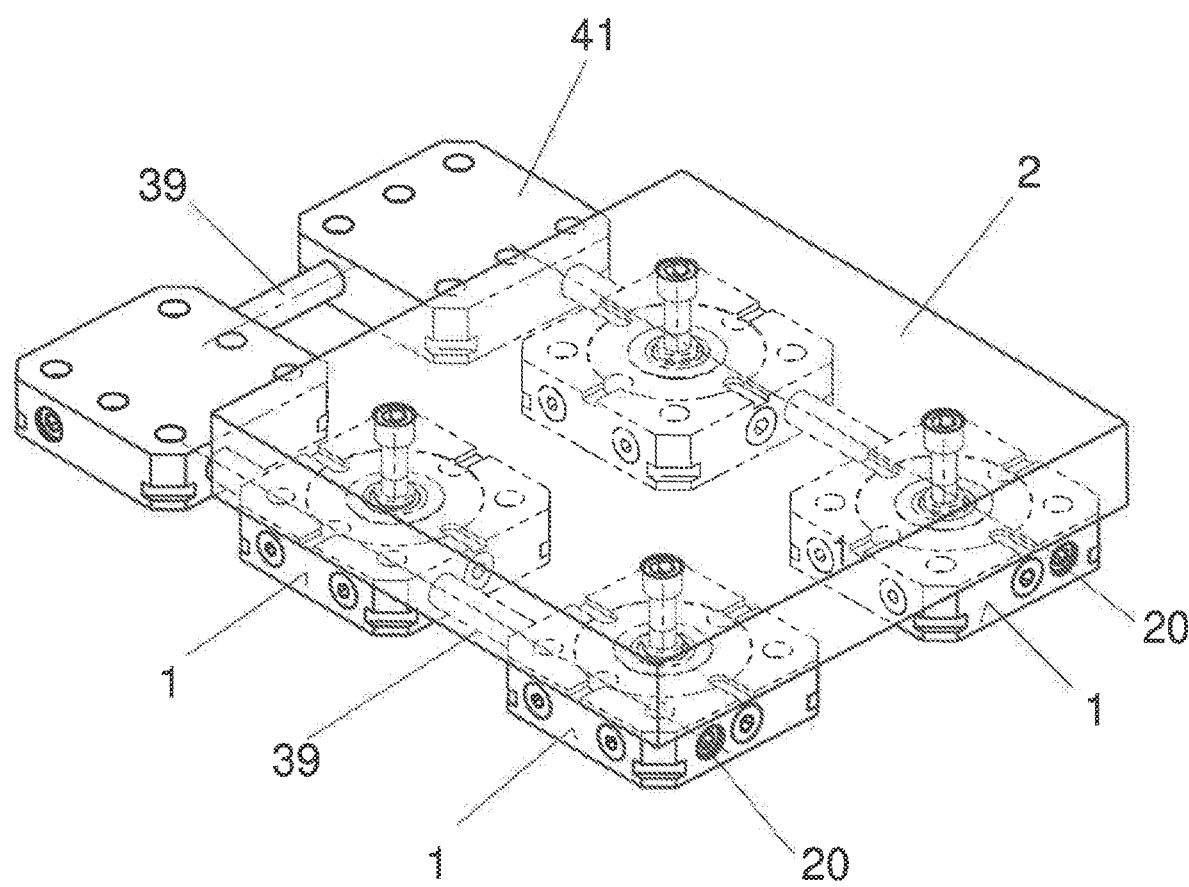
FIG. 6 shows six of the clamping devices according to FIG. 1, which are connected in pairs in a driving manner, in a perspective view.

FIG. 6 shows the assembly of several clamping devices 1 according to the present invention. Four clamping devices 1 support an object 2 in this case. Two adjacent clamping devices 1 can be coupled with one another via a shaft 39, in such a way that the respective actuating elements 11 are in a driving active connection via the shaft 39. This makes it possible for several clamping devices 1 to be driven simultaneously, for example by an electric motor 25. Two further clamping devices 1 do not fix an object 2; however, they are part of the drive train. Thus, power transmission takes place along a ring surface in the area of diameter D1.

Figure 7:
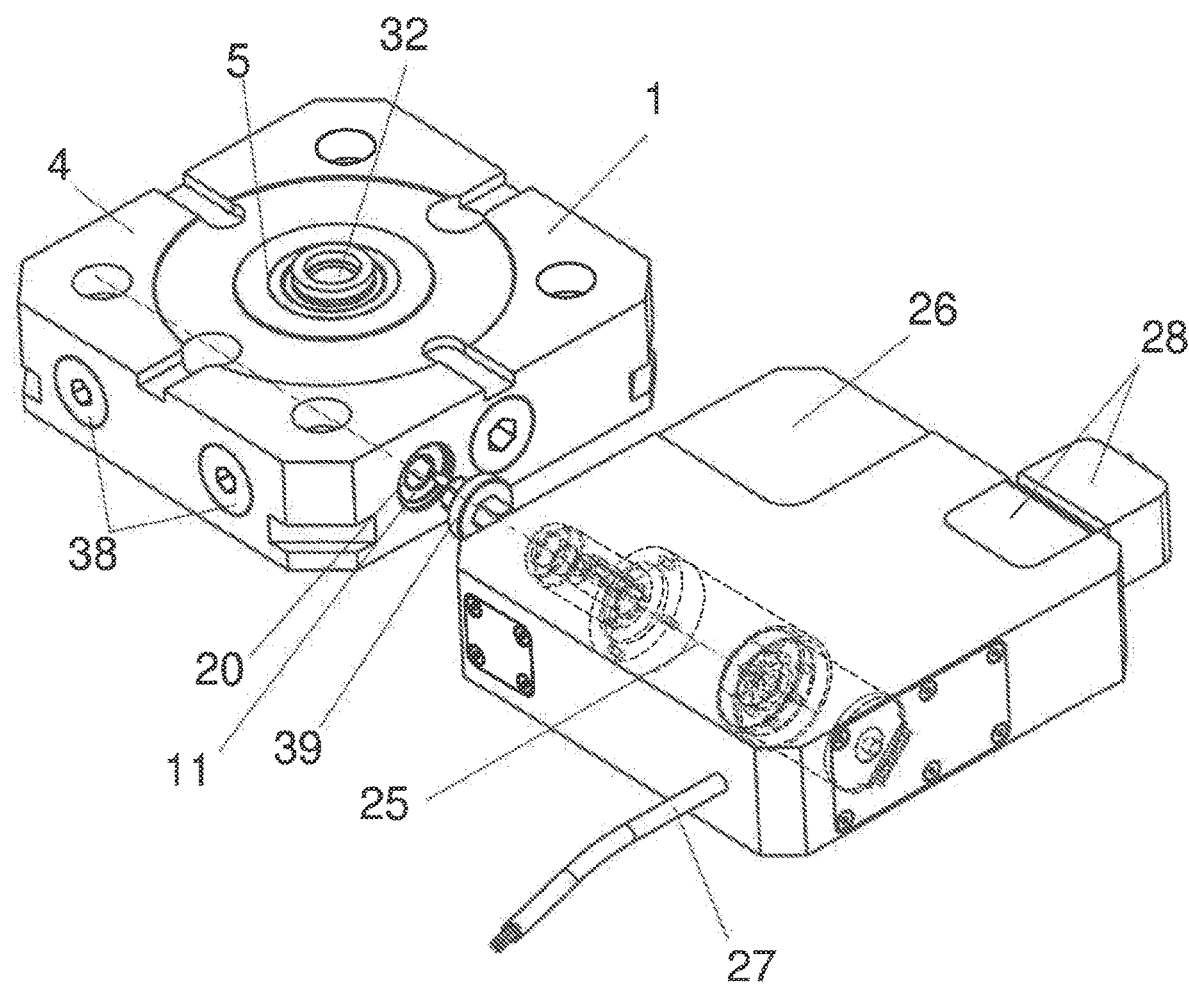
FIG. 7 shows an enlarged view of the driving connection between an electric motor and the clamping device according to FIG. 1.

FIG. 7 illustrates how an external electric motor 25 is to be connected to the actuating element 11. The electric motor 25 can be connected by means of a battery 29 or via electric cables 27 to a source of power not shown, in order to be able to provide the necessary energy for the movement of the actuating element 11.

Figure 8:
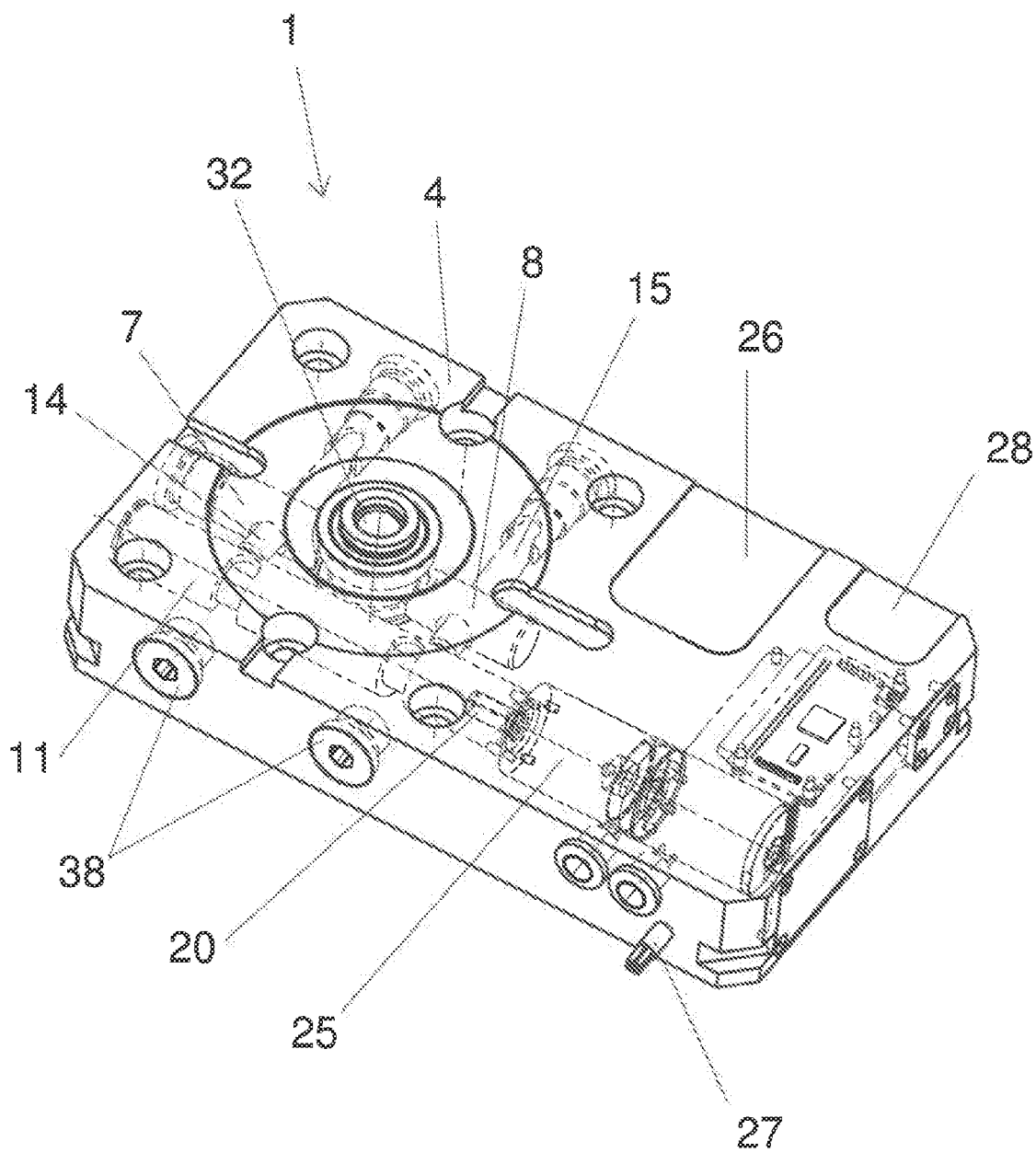
FIG. 8 shows the clamping device according to FIG. 1, in the housing of which an electric motor is arranged, which is coupled to the actuating element in a driving arrangement.

FIG. 8 shows that the electric motor 25 and a battery or inductive energy transfer device 28 can be installed inside the housing 4 of the clamping device 1. The arrangements shown in FIG. 8 and FIG. 6 are combined in that a clamping housing 4 designed according to FIG. 8 can drive several clamping devices 1 that do not require an electric motor 25. As a result, a user can interconnect several modules of clamping devices 1 without an independent electric drive, and one of the modules in this string of clamping devices 1 has an electric motor 25. The module of clamping device 1 equipped with the electric motor 25 can be located at any position in the drive train.

In the existing explanations, reference is made to the sample embodiment in which the clamping sleeve 32 is inserted into the receiving opening 5 and fixed in a centered position during the clamped condition. The clamping sleeve 32 is therefore a carrier part for the object 2, e.g. workpiece 2, tool or a pallet. It is understood by every skilled craftsman that a holding contour shaped to match the clamping sleeve 32 must be worked into each object 2, so that each object 2 can be inserted directly into the receiving opening 5 and be held therein in a positionally oriented and centered arrangement.

What is claimed is:

1. A zero-point clamping device (1) for centered locking of an object (2) with repeat accuracy, in particular a workpiece, a tool or a pallet, the zero-point clamping device comprising:
   a housing (4),
   a receiving opening (5) worked into the housing (4), which has a centering axis (6) with which the object (2) is aligned during the clamping process, and
   two opposite clamping slides (7, 8), each of which is mounted axially displaceably in a bore (9) provided in the housing (4) and which open into the receiving opening (5) during the clamped condition and thereby act on the object (2) or a carrier part (32) and center the object, wherein:
   an actuating element (11) is rotatably mounted in the housing (4), the axis of rotation (12) of which actuating element (11) runs parallel to the clamping slides (7, 8),
   a through-opening (13), which is aligned perpendicularly to the longitudinal axis (10) of the clamping slides (7, 8), is incorporated in each clamping slide (7, 8), and
   a pivot pin (14, 15) is inserted into each through-opening (13), one free end (16) of which pivot pin (14, 15) engages in a guide groove (18) incorporated in the actuating element (11) and is connected to the guide groove (18) in a driving arrangement, and a second free end (17) of the pivot pin (14, 15) is inserted into an abutment (21) associated with the housing (4) and is held in the latter in a tilting arrangement.

2. The clamping device according to claim 1, wherein the actuating element (11) is designed as a cylinder or tube, and in that the guide grooves (18) for each of the pivot pins (14, 15) actively coupled to a surface of the actuating element (11) are worked into the surface, the free ends (16) of the pivot pins (14, 15) being held guided in said guide grooves (18).

3. The clamping device according to claim 2, wherein the guide grooves (18) are inclined in relation to the axis of rotation (12) of the actuating element (11) and extend substantially spirally over part of the circumference of the surface of the actuating element (11).

4. The clamping device according to claim 3, wherein the guide grooves (18) worked into the outer surface of the actuating element (11) have two stops (22, 23) spaced apart from one another, by means of which the free ends (16) of the pivot pins (14, 15) are restrained in their freedom of movement and serve as a contact surface for the pivot pins (14, 15).

5. The clamping device according to claim 1, wherein, the second free end (17) of the respective pivot pins (14, 15), which are arranged in the abutment (21) associated with the housing (4) are designed as a ball head or with a curved outer contour, and in that the respective abutment (21) has an inner contour which is matched to the outer contour of the second free end (17) of the respective pivot pins (14, 15) in such a way that the pivot pins (14, 15) are held such that they can move about their own longitudinal axis (19).

6. The clamping device according to claim 1, wherein, the through-opening (9) incorporated in the clamping slides (7, 8) has an outwardly curved inner contour, the diameter of which is larger in the outer region than in the center of the clamping slides (7, 8), and in that the diameter in the center of the through-opening (9) is adapted to the diameter or the width of the pivot pins (7, 8) is adapted in such a way that the pivot pins (7, 8) rest against the inner wall of the through-opening (9) in the region of the longitudinal axis (10) of the respective clamping slides (7, 8) and are guided by them.

7. The clamping device according to claim 1, wherein, a tilting movement is exerted on the respective pivot pins (14, 15) by the rotation of the actuating element (11), and in that the tilting movement of the pivot pins (14, 15) causes the respective clamping slide (7, 8) to be movable radially in the direction of the center of the receiving opening (5) or in the opposite direction thereto.

8. The clamping device according to claim 1, wherein, the actuating element (11) is freely accessible from the outside and in that the actuating element (11) can be acted upon manually and/or by means of an electric motor (25).

9. The clamping devices according to claim 1, wherein, an electric motor (25) is provided in the interior of the housing (4) of the clamping device (1), which electric motor (25) is drivingly connected to the actuating element (11), and in that the electric motor (25) is supplied with power via electric cables (27) or via an inductive interface (28), or in that a battery (26) is provided in the housing (4) of the clamping device (1), which battery (26) is electrically connected to the respective electric motor (25) and supplies the latter with power.

10. The clamping device according to claim 1, wherein, a plurality of clamping devices (1) are coupled to one another in a driving arrangement, preferably in that each actuating element (11) of one of the clamping devices (1) is operatively connected to an adjacent actuating element (11) in a non-positive or positive manner.

11. The clamping device according to claim 1, wherein, an oblique plane, which is inclined in relation to the horizontal or vertical, is integrally formed at the free ends of the clamping slides (7, 8), which engage in the receiving opening (5) during the clamped condition, and in that a clamping sleeve (32) can be inserted into the receiving opening (5), on the outer surface of which a centered receptacle (33) is incorporated which, in the clamped condition, interacts with the oblique planes (34) of the clamping slides (7, 8) and thus secures the clamping sleeve (32) in the radial and axial directions.

12. The clamping device according to claim 1, wherein, the abutment (21) is designed as a threaded pin, the free end of which, associated with the respective pivot pin (14, 15), has a cup-like recess into which a ball head of the respective pivot pin (14, 15) is inserted, and in that the threaded pin (21) is screwed into a threaded bore (35) made in the housing (4).

13. The clamping device according to claim 1, wherein, the clamping slides (7, 8), the actuating element (11) and the pivot pins (14, 15) are arranged on a common plane.

14. The clamping device according to claim 1, wherein, the guide grooves (18) provided in the actuating element (11) serve as axial bearings, and in that a bearing pin (37), which is screwed into the housing (4) from outside and by means of which the actuating element (11) is held in the axial direction, engages in the guide grooves (18).

15. The clamping device according to claim 14, wherein, the guide grooves (18) have at least two different angles of inclination or pitch (q1, q2) by means of which a feed speed and an actuating force of the clamping slides (7, 8) can be preset or predetermined.

\* \* \* \* \*